United States Patent
Roy et al.

(10) Patent No.: US 8,060,626 B2
(45) Date of Patent: Nov. 15, 2011

(54) METHOD FOR HOST SELECTION BASED ON DISCOVERED NAT TYPE

(75) Inventors: Ronald J. Roy, San Diego, CA (US); Mark L. Jacob, San Diego, CA (US)

(73) Assignee: Sony Computer Entertainment America LLC.

( * ) Notice: Subject to any disclaimer, the term of this patent is extended or adjusted under 35 U.S.C. 154(b) by 159 days.

(21) Appl. No.: 12/235,409

(22) Filed: Sep. 22, 2008

(65) Prior Publication Data

US 2010/0077087 A1   Mar. 25, 2010

(51) Int. Cl.
*G06F 15/16* (2006.01)
*G06F 15/173* (2006.01)

(52) U.S. Cl. ....................... 709/228; 709/238

(58) Field of Classification Search .................. 709/228
See application file for complete search history.

(56) References Cited

U.S. PATENT DOCUMENTS

| | | |
|---|---|---|
| 4,764,928 A | 8/1988 | Akerberg |
| 4,787,051 A | 11/1988 | Olson |
| 4,843,568 A | 6/1989 | Krueger |
| 5,128,671 A | 7/1992 | Thomas, Jr. |
| 5,528,265 A | 6/1996 | Harrison |
| 5,544,325 A | 8/1996 | Denny et al. |
| 5,596,720 A | 1/1997 | Hamada et al. |
| 5,630,184 A | 5/1997 | Roper et al. |
| 5,636,216 A | 6/1997 | Fox et al. |
| 5,701,427 A | 12/1997 | Lathrop |
| 5,768,382 A | 6/1998 | Schneier et al. |
| 5,768,531 A | 6/1998 | Lin |
| 5,793,763 A | 8/1998 | Mayes et al. |
| 5,809,016 A | 9/1998 | Kreitzer et al. |
| 5,812,531 A | 9/1998 | Cheung et al. |
| 5,835,726 A | 11/1998 | Shwed et al. |
| 5,856,972 A | 1/1999 | Riley et al. |
| 5,898,679 A | 4/1999 | Brederveld et al. |
| 5,956,485 A | 9/1999 | Perlman |
| 6,012,096 A | 1/2000 | Link et al. |
| 6,058,431 A | 5/2000 | Srisuresh et al. |
| 6,128,623 A | 10/2000 | Mattis et al. |
| 6,128,624 A | 10/2000 | Papierniak et al. |
| 6,128,627 A | 10/2000 | Mattis et al. |

(Continued)

FOREIGN PATENT DOCUMENTS

EP    0 913 965    5/1999

(Continued)

OTHER PUBLICATIONS

U.S. Appl. No. 12/235,438, filed Sep. 22, 2008 by Mark Lester Jacob et al.

(Continued)

*Primary Examiner* — Ario Etienne
*Assistant Examiner* — Blake Rubin
(74) *Attorney, Agent, or Firm* — Joshua D. Isenberg; JDI Patent (57) ABSTRACT

A host may be selected for a peer-to-peer grid based on discovered NAT type. NAT profile information may be collected by each of the peers and shared with the other peers. Each peer receives NAT profile information for the other peers. Each peer may determine from the NAT profile information for the peer and the NAT profile information for the other peers which of the two or more peers to designate as the host.

16 Claims, 4 Drawing Sheets

U.S. PATENT DOCUMENTS

| | | |
|---|---|---|
| 6,128,664 A | 10/2000 | Yanagidate et al. |
| 6,151,584 A | 11/2000 | Papierniak et al. |
| 6,151,601 A | 11/2000 | Papierniak et al. |
| 6,152,824 A | 11/2000 | Rothschild et al. |
| 6,157,368 A | 12/2000 | Fager |
| 6,208,649 B1 | 3/2001 | Kloth |
| 6,209,003 B1 | 3/2001 | Mattis et al. |
| 6,212,565 B1 | 4/2001 | Gupta |
| 6,212,633 B1 | 4/2001 | Levy et al. |
| 6,289,358 B1 | 9/2001 | Mattis et al. |
| 6,292,880 B1 | 9/2001 | Mattis et al. |
| 6,327,630 B1 | 12/2001 | Carroll et al. |
| 6,333,931 B1 | 12/2001 | LaPier et al. |
| 6,349,210 B1 | 2/2002 | Li |
| 6,353,891 B1 | 3/2002 | Borella et al. |
| 6,375,572 B1 | 4/2002 | Masuyama |
| 6,389,462 B1 | 5/2002 | Cohen et al. |
| 6,393,488 B1 | 5/2002 | Araujo |
| 6,405,104 B1 | 6/2002 | Dougherty |
| 6,421,347 B1 | 7/2002 | Borgstahl et al. |
| 6,487,583 B1 | 11/2002 | Harvey et al. |
| 6,487,600 B1 | 11/2002 | Lynch |
| 6,535,511 B1 | 3/2003 | Rao |
| 6,549,786 B2 | 4/2003 | Cheung et al. |
| 6,553,515 B1 | 4/2003 | Gross et al. |
| 6,581,108 B1 | 6/2003 | Denison et al. |
| 6,590,865 B1 | 7/2003 | Ibaraki et al. |
| 6,616,531 B1 | 9/2003 | Mullins |
| 6,618,757 B1 | 9/2003 | Babbitt et al. |
| 6,636,898 B1 | 10/2003 | Ludovici et al. |
| 6,640,241 B1 | 10/2003 | Ozzie et al. |
| 6,641,481 B1 | 11/2003 | Mai et al. |
| 6,667,972 B1 | 12/2003 | Foltan et al. |
| 6,668,283 B1 | 12/2003 | Sitaraman et al. |
| 6,701,344 B1 | 3/2004 | Holt et al. |
| 6,704,574 B2 | 3/2004 | Lin |
| 6,712,697 B2 | 3/2004 | Acres |
| 6,772,219 B1 | 8/2004 | Shobatake |
| 6,779,017 B1 | 8/2004 | Lamberton et al. |
| 6,779,035 B1 | 8/2004 | Gbadegesin |
| 6,789,126 B1 | 9/2004 | Saulpaugh et al. |
| 6,799,255 B1 | 9/2004 | Blumenau et al. |
| 6,807,575 B1 | 10/2004 | Emaru et al. |
| 6,816,703 B1 | 11/2004 | Wood et al. |
| 6,829,634 B1 | 12/2004 | Holt et al. |
| 6,848,997 B1 | 2/2005 | Hashimoto et al. |
| 6,891,801 B1 | 5/2005 | Herzog |
| 6,899,628 B2 | 5/2005 | Leen et al. |
| 6,920,501 B2 | 7/2005 | Chu et al. |
| 6,978,294 B1 | 12/2005 | Adams et al. |
| 7,016,942 B1 | 3/2006 | Odom |
| 7,017,138 B2 | 3/2006 | Zirojevic et al. |
| 7,035,911 B2 | 4/2006 | Lowery et al. |
| 7,043,641 B1 | 5/2006 | Martinek et al. |
| 7,065,579 B2 | 6/2006 | Traversat et al. |
| 7,082,316 B2 | 7/2006 | Eiden et al. |
| 7,096,006 B2 | 8/2006 | Lai et al. |
| 7,107,348 B2 | 9/2006 | Shimada et al. |
| 7,120,429 B2 | 10/2006 | Minear et al. |
| 7,123,608 B1 | 10/2006 | Scott et al. |
| 7,127,613 B2 | 10/2006 | Pabla et al. |
| 7,130,921 B2 | 10/2006 | Goodman et al. |
| 7,133,368 B2 | 11/2006 | Zhang et al. |
| 7,134,961 B2 | 11/2006 | Hora |
| 7,155,515 B1 | 12/2006 | Brown et al. |
| 7,155,518 B2 | 12/2006 | Forslow |
| 7,168,089 B2 | 1/2007 | Nguyen et al. |
| 7,174,382 B2 | 2/2007 | Ramanathan et al. |
| 7,177,950 B2 | 2/2007 | Narayan et al. |
| 7,177,951 B1 | 2/2007 | Dykeman et al. |
| 7,194,654 B2 | 3/2007 | Wray et al. |
| 7,197,565 B2 | 3/2007 | Abdelaziz et al. |
| 7,203,841 B2 | 4/2007 | Jackson et al. |
| 7,216,359 B2 | 5/2007 | Katz et al. |
| 7,240,093 B1 | 7/2007 | Danieli et al. |
| 7,243,141 B2 | 7/2007 | Harris |
| 7,254,709 B1 | 8/2007 | Richard |
| 7,263,070 B1 | 8/2007 | Delker et al. |
| 7,272,636 B2 | 9/2007 | Pabla |
| 7,321,928 B2 | 1/2008 | Feltin et al. |
| 7,340,500 B2 | 3/2008 | Traversat et al. |
| 7,346,015 B2 | 3/2008 | Shipman |
| 7,392,375 B2 | 6/2008 | Bartram et al. |
| 7,398,388 B2 | 7/2008 | Xu et al. |
| 7,407,434 B2 | 8/2008 | Thomas et al. |
| 7,429,215 B2 | 9/2008 | Rozkin et al. |
| 7,451,490 B2 | 11/2008 | Pirich et al. |
| 7,457,279 B1 | 11/2008 | Scott et al. |
| 7,533,172 B2 | 5/2009 | Traversat et al. |
| 7,738,468 B2 | 6/2010 | Standridge et al. |
| 7,803,052 B2 | 9/2010 | Multerer et al. |
| 2001/0005368 A1 | 6/2001 | Rune |
| 2001/0017856 A1 | 8/2001 | Asokan et al. |
| 2001/0021188 A1 | 9/2001 | Fujimori et al. |
| 2001/0044339 A1 | 11/2001 | Cordero et al. |
| 2001/0046213 A1 | 11/2001 | Sakoda |
| 2002/0002074 A1 | 1/2002 | White et al. |
| 2002/0006114 A1 | 1/2002 | Bjelland et al. |
| 2002/0013838 A1 | 1/2002 | Kushida et al. |
| 2002/0016826 A1 | 2/2002 | Johansson et al. |
| 2002/0035604 A1 | 3/2002 | Cohen et al. |
| 2002/0055989 A1 | 5/2002 | Stringer-Calvert et al. |
| 2002/0075844 A1* | 6/2002 | Hagen .................... 370/351 |
| 2002/0085097 A1 | 7/2002 | Colmenarez et al. |
| 2002/0097732 A1 | 7/2002 | Worster et al. |
| 2002/0107786 A1 | 8/2002 | Lehmann-Haupt et al. |
| 2002/0107935 A1 | 8/2002 | Lowery et al. |
| 2002/0119821 A1 | 8/2002 | Sen et al. |
| 2002/0128471 A1 | 9/2002 | Ashley et al. |
| 2002/0143855 A1 | 10/2002 | Traversat et al. |
| 2002/0147810 A1 | 10/2002 | Traversat et al. |
| 2002/0161821 A1 | 10/2002 | Narayan et al. |
| 2002/0183004 A1 | 12/2002 | Fulton et al. |
| 2002/0184310 A1 | 12/2002 | Traversat et al. |
| 2002/0184311 A1 | 12/2002 | Traversat et al. |
| 2003/0027634 A1 | 2/2003 | Matthews, III |
| 2003/0028585 A1 | 2/2003 | Yeager et al. |
| 2003/0045359 A1 | 3/2003 | Leen et al. |
| 2003/0046292 A1 | 3/2003 | Subramanian et al. |
| 2003/0051052 A1 | 3/2003 | Shteyn et al. |
| 2003/0055892 A1 | 3/2003 | Huitema et al. |
| 2003/0055978 A1 | 3/2003 | Collins |
| 2003/0079003 A1 | 4/2003 | Burr |
| 2003/0084282 A1 | 5/2003 | Taruguchi |
| 2003/0097408 A1 | 5/2003 | Kageyama et al. |
| 2003/0104829 A1 | 6/2003 | Alzoubi et al. |
| 2003/0115258 A1 | 6/2003 | Baumeister et al. |
| 2003/0126229 A1 | 7/2003 | Kantor et al. |
| 2003/0126245 A1 | 7/2003 | Feltin et al. |
| 2003/0135625 A1 | 7/2003 | Fontes et al. |
| 2003/0152034 A1 | 8/2003 | Zhang et al. |
| 2003/0158961 A1 | 8/2003 | Nomura et al. |
| 2003/0162556 A1 | 8/2003 | Libes |
| 2003/0177187 A1 | 9/2003 | Levine et al. |
| 2003/0182421 A1 | 9/2003 | Faybishenko et al. |
| 2003/0182428 A1 | 9/2003 | Li et al. |
| 2003/0191828 A1 | 10/2003 | Ramanathan et al. |
| 2003/0217096 A1 | 11/2003 | McKelvie et al. |
| 2003/0217135 A1 | 11/2003 | Chatani et al. |
| 2003/0227939 A1 | 12/2003 | Yukie et al. |
| 2003/0229779 A1 | 12/2003 | Morais et al. |
| 2003/0229789 A1 | 12/2003 | Morais et al. |
| 2003/0233281 A1 | 12/2003 | Takeuchi et al. |
| 2004/0007618 A1 | 1/2004 | Oram et al. |
| 2004/0015548 A1 | 1/2004 | Lee |
| 2004/0018839 A1 | 1/2004 | Andric et al. |
| 2004/0024879 A1 | 2/2004 | Dingman et al. |
| 2004/0063497 A1 | 4/2004 | Gould |
| 2004/0085947 A1 | 5/2004 | Ekberg et al. |
| 2004/0087369 A1 | 5/2004 | Tanaka |
| 2004/0088369 A1 | 5/2004 | Yeager et al. |
| 2004/0103179 A1 | 5/2004 | Damm et al. |
| 2004/0110563 A1 | 6/2004 | Tanaka et al. |
| 2004/0133631 A1 | 7/2004 | Hagen et al. |
| 2004/0139228 A1 | 7/2004 | Takeda et al. |
| 2004/0162871 A1 | 8/2004 | Pabla et al. |
| 2004/0181463 A1 | 9/2004 | Goldthwaite et al. |

| | | | |
|---|---|---|---|
| 2004/0207880 A1 | 10/2004 | Thakur |
| 2004/0212589 A1 | 10/2004 | Hall et al. |
| 2004/0236863 A1 | 11/2004 | Shen et al. |
| 2004/0236945 A1 | 11/2004 | Risan et al. |
| 2004/0243665 A1 | 12/2004 | Markki et al. |
| 2004/0249891 A1 | 12/2004 | Khartabil et al. |
| 2004/0254977 A1 | 12/2004 | Zhang |
| 2004/0267876 A1 | 12/2004 | Kakivaya et al. |
| 2005/0007964 A1 | 1/2005 | Falco et al. |
| 2005/0015626 A1 | 1/2005 | Chasin |
| 2005/0020354 A1 | 1/2005 | Nguyen et al. |
| 2005/0026698 A1 | 2/2005 | Pirich et al. |
| 2005/0063409 A1 | 3/2005 | Oommen |
| 2005/0064939 A1 | 3/2005 | McSheffrey et al. |
| 2005/0065632 A1 | 3/2005 | Douglis et al. |
| 2005/0080858 A1 | 4/2005 | Pessach |
| 2005/0086287 A1 | 4/2005 | Datta |
| 2005/0086288 A1 | 4/2005 | Datta et al. |
| 2005/0086329 A1 | 4/2005 | Datta et al. |
| 2005/0086350 A1 | 4/2005 | Mai |
| 2005/0086369 A1 | 4/2005 | Mai et al. |
| 2005/0105526 A1 | 5/2005 | Stiemerling et al. |
| 2005/0141522 A1 | 6/2005 | Kadar et al. |
| 2005/0149481 A1 | 7/2005 | Hesselink et al. |
| 2005/0221858 A1 | 10/2005 | Hoddie |
| 2005/0250487 A1 | 11/2005 | Miwa |
| 2005/0251577 A1* | 11/2005 | Guo et al. | 709/230 |
| 2005/0259637 A1* | 11/2005 | Chu et al. | 370/352 |
| 2005/0262411 A1 | 11/2005 | Vertes |
| 2006/0015582 A1 | 1/2006 | Morita et al. |
| 2006/0063587 A1 | 3/2006 | Manzo |
| 2006/0067290 A1 | 3/2006 | Miwa |
| 2006/0068702 A1 | 3/2006 | Miwa |
| 2006/0075127 A1 | 4/2006 | Juncker et al. |
| 2006/0084504 A1 | 4/2006 | Chan et al. |
| 2006/0111979 A1 | 5/2006 | Chu |
| 2006/0209822 A1 | 9/2006 | Hamamoto |
| 2006/0218624 A1 | 9/2006 | Ravikumar et al. |
| 2006/0288103 A1* | 12/2006 | Gobara et al. | 709/224 |
| 2007/0058792 A1* | 3/2007 | Chaudhari et al. | 379/88.17 |
| 2007/0061460 A1 | 3/2007 | Khan et al. |
| 2007/0076729 A1 | 4/2007 | Takeda et al. |
| 2007/0077981 A1 | 4/2007 | Hungate et al. |
| 2007/0150552 A1 | 6/2007 | Harris et al. |
| 2007/0165629 A1 | 7/2007 | Chaturvedi et al. |
| 2007/0191109 A1 | 8/2007 | Crowder et al. |
| 2007/0198418 A1 | 8/2007 | MacDonald et al. |
| 2007/0208748 A1 | 9/2007 | Li |
| 2007/0213124 A1 | 9/2007 | Walker et al. |
| 2007/0217436 A1 | 9/2007 | Markley et al. |
| 2007/0237153 A1 | 10/2007 | Slaughter et al. |
| 2009/0077245 A1* | 3/2009 | Smelyansky et al. | 709/228 |
| 2009/0094370 A1 | 4/2009 | Jacob et al. |
| 2009/0111532 A1 | 4/2009 | Slaughter et al. |
| 2009/0138610 A1* | 5/2009 | Gobara et al. | 709/228 |
| 2009/0228593 A1 | 9/2009 | Takeda |
| 2009/0240821 A1* | 9/2009 | Juncker et al. | 709/228 |
| 2010/0039937 A1 | 2/2010 | Ramanujan et al. |

FOREIGN PATENT DOCUMENTS

| | | |
|---|---|---|
| EP | 1 107 508 | 6/2001 |
| EP | 1 374 959 | 5/2003 |
| JP | 2001 53901 | 2/2001 |
| JP | 2002 10321 | 1/2002 |
| JP | 2004 135778 | 5/2004 |
| JP | 2004 136009 | 5/2004 |
| JP | 2004 141225 | 5/2004 |
| JP | 2005 319047 | 11/2005 |
| JP | 2005 323116 | 11/2005 |
| JP | 2005 323117 | 11/2005 |
| JP | 2005346461 | 12/2005 |
| JP | 2006136031 | 5/2006 |
| WO | WO 99/35799 | 7/1999 |
| WO | WO 01/97485 | 12/2001 |
| WO | WO 02/03217 | 1/2002 |
| WO | 02/11366 | 2/2002 |
| WO | WO 02/23822 | 3/2002 |
| WO | 03/069495 | 8/2003 |
| WO | 2004/038541 A2 | 5/2004 |
| WO | WO2004063843 | 7/2004 |
| WO | WO2005088466 | 9/2005 |
| WO | 2007041417 | 4/2007 |

OTHER PUBLICATIONS

U.S. Appl. No. 12/049,954, filed Mar. 17, 2008 by Mark Lester Jacob et al.

U.S. Appl. No. 60/997,918, filed Oct. 5, 2007.

The International Search Report of the Written Opinion of the International Searching Authority dated Nov. 6, 2009 for the international application No. PCT/US2009/057192.

Cell Broadband Engine Architecture, copyright International Business Machines Corporation, Sony Computer Entertainment Incorporated, Toshiba Corporation Aug. 8, 2005 which may be downloaded at http://cell.scei.co.jp/.

Arno Wacker et al—"A NAT Traversal Mechanism for Peer-to Peer Networks"—Eighth International Conference on Peer-to Peer Computing (P2P'08), 2008. IEEE. pp. 81-83.

Jim Dowling et al.—"Improving ICE Service Selection in a P2P System using the Gradient Topology"—First International Conference on Self-Adaptive and Self-Organizing Systems (SASO 07), 2007, IEEE, pp. 285-288.

European Search Report dated Jan. 28, 2010 issued for European patent application No. 99252219.2.

J. Rosenberg, Simple Traversal of UDP Through Network Address Translators (NAT), BEHAVE Inernet-Draft, Jul. 17, 2005.

J. Rosenberg, Interactive Connectivity Establishment (ICE): A methodology for Network Address Translator (NAT) Traversal for Offer/Answer Protocols, MMusic Internet-Draft, Jul. 17, 2005.

F. Audet, NAT Behavioral Requirements for Unicast UDP, BEHAVE Internet-Draft, Jul. 15, 2005.

J. Rosenberg, Interactive Connectivity Establishment (ICE): A Methodology for Network Address Translator (NAT) Traversal for Multimedia Session Establishment Protocols, MMusic Internet-Draft, Oct. 25, 2004.

J. Rosenberg, Traversal Using Relay NAT (TURN), MIDCOM Internet-Draft, Oct. 20, 2003.

Y. Takeda, Symmetric NAT Traversal Using STUN, Internet Engineering Task Force, Jun. 2003.

J. Rosenberg, Interactive Connectivity Establishment (ICE): A Methodology for Network Address Translator (NAT) Traversal for Offer/Answer Protocols, MMusic Internet-Draft, Jan. 16, 2007.

J. Rosenberg, Interactive Connectivity Establishment (ICE): A Methodology for Network Address Translator (NAT) Traversal for Multimedia Session Establishment Protocols, MMusic Internet-Draft, Jul. 19, 2004.

J Rosenberg, STUN—Simple Traversal of User Datagram Protocols (UDP) Through Network Address Translator (NATs), Network Working Group, Mar. 2003.

Final Office Action dated Apr. 12, 2010 issued for U.S. Appl. No. 11/243,853.

Office Action dated Jun. 4, 2009 issued for U.S. Appl. No. 10/215,899.

Office Action dated Nov. 7, 2008 issued for U.S. Appl. No. 10/215,899.

Office Action dated Mar. 13, 2008 issued for U.S. Appl. No. 10/215,899.

Office Action dated Sep. 11, 2007 issued for U.S. Appl. No. 10/215,899.

Office Action dated Mar. 22, 2007 issued for U.S. Appl. No. 10/215,899.

Office Action dated Aug. 12, 2005 issued for U.S. Appl. No. 10/215,899.

NAT and Network Games, p. 1-5, entitled: Just the FAOs, Ma'am, http://www.u.arizona.edu/~trw/games/nat.htm, Oct. 23, 2002.

BroadbandReports.com, How to hookup our console to the net—section all, pp. 1 to 22, http://www.dslreports.com/faq/onlinegaming/all.

Do I use NAT?, pp. 1 to 3, http://www.u.arizona.edu/~trw/games/nat or not.php, Oct. 23, 2002.

Home Toys Article, HAI Omni Solution, UPnP NAT Traversal FAQ, pp. 1 to 4 http://hometoys.com/htinews/aug01/articles/microsoft/upnp.htm, Nov. 11, 2002.

InternetGatewayDevice: I Device Template Version 1.01, Copyright 1999-2001 Microsoft Corporation, 16 pgs.

STUN—Simple Traversal of UDP Thrugh NATs, J. Rosenberg et al. pp. 1-29, Copyright The Internet Society.

Traversal Using Relay NAT (TURN), Rosenberg, Weinberger, Huitema, Mahy, Nov. 14, 2001, pp. 1 to 17.

http://www2.simplex.com/ip.shtml.

http://www.dslreports.com/ip.

Network Address Translators. Microsoft Corporation Jan. 2001, http://msdn.microsoft.com/library/default.asp?irl=/library/en-us/dnplay/html/nats2-msdn.asp.

Nat and Peer-to-Peer networking, Dan Kegel. Copyright 1999 http://alumnus.caltech.edu/-dank/peer-nat.html.

Office Action dated May 5, 2009 issued for U.S. Appl. No. 11/708,988.

Final Office Action dated Oct. 29, 2009 issued for U.S. Appl. No. 11/708,988.

Office Action dated Feb. 22, 2010 issued for U.S. Appl. No. 11/708,988.

Notice of Allowance and Fee(s) Due dated Oct. 28, 2009 for U.S. Appl. No. 10/215,899.

Office Action issued by the European Patent Office (EPO) on Feb. 17, 2010 for European patent application No. 09022219.2.

Office Action issued by the USPTO on Apr. 15, 2010 for U.S. Appl. No. 12/235,438.

Final Office Action dated Aug. 31, 2010 issued for U.S. Appl. No. 12/235,438.

Office Action dated Aug. 31, 2010 issued for U.S. Appl. No. 11/243,853.

Notice of Allowance and Fees Due dated Jul. 22, 2010 issued for U.S. Appl. No. 12/043,080.

PCT International Search Report and Written Opinion of the Internal Searching Authority dated Sep. 28, 2009 for international application No. PCT/US2009/034913.

PCT International Search Report and Written Opinion of the Internal Searching Authority dated Jan. 24, 2007 for international application No. PCT/US2006/38285.

Office Action dated Feb. 15, 2011 for U.S. Appl. No. 11/243,853, 25 pages.

Steven Hessing; "Peer to Peer Messaging Protocol (PPMP)" Internet Draft. Apr. 2002. pp. 1-57, XP015001173.

Song Jiang et al: "FloodTrial : an efficient file search technique in unstructured peeito-peer systems" GLOBECOM 2003, vol. 5, Dec. 1, 2003, pp. 2891-2895, XP010678188.

Dutkiewicz E Ed—Institute of Electrical and Electronics Engineers: "Impact of transmit range on throughput performance in mobile: ad hoc networks" ICC 2001, 2001 IEEE International Conference on Communicanons Conference Record, Helsinky, Finland, Jun. II 14, 2001 IEEE International Conference on Communications, NewYork, NY IEEE, US, vol. vol. 1 of 10, Jun. 11, 2001, pp. 2933-2937, XP 010553662 ISBN: 0-7803-7097-1.

Kim Y Ed - Association for Computing Machinery: "Simple and Fault—Tolerant Key Agreement by Dynamic Collaborative Groups", Proceedings of the 7m ACM Conference on Computer and Communications Security, CS 2000. Athens, Greece, Nov. 1-4,2000, ACM Conference on Computer and Communications Security, New Your, NY: ACM, US, vol, Conf. 7, 1 Nov. 2000, pp. I 38, XP 002951317 ISBN: 1-5811.3-203 4.

Baughman et al., Cheat-proof playout for centralized and distributed online games, INFOCOM2001, Twentieth Annual Joint Conference of the IEEE Computer and Communications Societies, Proceedings. IEEE Publication Date: 2226 Apr. 2001, on pp. 104-113, vol. 1.

Japanese Office Action for Japanese Patent Application No. 2009-217541 dated Aug. 9, 2011.

Office Action for U.S. Appl. No. 11/243,853 dated Aug. 16, 2011.

Final Office Action for U.S. Appl. No. 12/267,254 dated Aug. 8, 2011.

* cited by examiner

METHOD FOR HOST SELECTION BASED ON DISCOVERED NAT TYPE

CROSS-REFERENCE TO RELATED APPLICATIONS

This application is related to commonly-assigned U.S. patent application Ser. No. 12/235,438 to Mark Lester Jacob et al. entitled "SEAMLESS HOST MIGRATION BASED ON NAT TYPE," filed the same date as the present application, the entire contents of which are incorporated herein by reference.

This application is related to U.S. patent application Ser. No. 12/049,954 to Mark Lester Jacob et al. entitled "SYSTEM AND METHODS FOR SEAMLESS HOST MIGRATION", filed Mar. 17, 2008, the entire contents of which are incorporated herein by reference. This application is also related to U.S. Provisional Patent Application No. 60/997,918 filed Oct. 5, 2007 and entitled "Systems and Methods for Seamless Host Migration", the disclosure of which is incorporated herein by reference.

This application is related to commonly-assigned US Patent Application Publication Number 20070076729 to Yutaka Takeda et al. entitled "PEER-TO-PEER COMMUNICATION TRAVERSING SYMMETRIC NETWORK ADDRESS TRANSLATORS", filed Oct. 4, 2005, the entire contents of which are incorporated herein by reference.

FIELD OF THE INVENTION

This invention is related to computer networks and more specifically to determination of a host for peer-to-peer communication among several clients of a computer network.

BACKGROUND OF THE INVENTION

Presently, during game play amongst several clients of a computer network, clients communicate directly with the server. The central server processes data from every client relaying this data to all other clients so that several clients in the network can engage in game play with each other through a central server. The central server's ability to communicate data amongst several clients is limited by bandwidth, and so communication outside of game play data is limited.

Aside from game play data, clients may want to communicate other information to each other without having to go through a bandwidth-limited central server. Examples of such communication may include voice over Internet protocol (VoIP), bit torrents, video data, file sharing, and data streaming. By allowing clients to communicate amongst each other without the need of a central server, some of the central server's responsibilities may be offloaded to the clients.

A peer-to-peer network is established when a host is determined amongst the numerous clients participating in the P2P network. The host takes the duty of a central server and directs communication amongst clients (hereinafter referred to as peers when referencing non-hosts in a P2P network).

It is within this context the embodiments of the present invention arise.

DESCRIPTION OF THE SPECIFIC EMBODIMENTS

Introduction

One problem that arises when trying to establish communication amongst clients through peer-to-peer communication (P2P) is the issue of network address translation (NAT). Most clients connected to the central server are situated behind a NAT. NAT is an Internet standard that enables a local area network (LAN) to use one set of private IP addresses for internal traffic and a second set of global IP addresses for external traffic. It is therefore desirable for a host in a P2P network to have a favorable NAT profile in order to create an optimal P2P network.

Thus, there is need in the art, for a method of determining a host with a favorable NAT profile amongst several clients connected to a central server.

There are 4 types of NATs available: Full Cone NAT, Restricted Cone NAT, Port Restricted Cone NAT, and Symmetric NAT. A full cone NAT is one where all requests from the same internal IP address and port are mapped to the same external IP address and port. Furthermore, any external host can send a packet to the internal host by sending a packet to the mapped external address.

In a restricted cone NAT, all requests from the same internal IP address and port are mapped to the same external IP address and port. Unlike a full cone NAT, an external host (with IP address X) can send a packet to the internal host only if the internal host had previously sent a packet to IP address X.

A port restricted NAT is like a restricted cone NAT, but the restriction includes port numbers. Specifically, an external host can send a packet with source IP address X and source port P to the internal host only if the internal host had previously sent a packet from IP address X and port P.

In a symmetric NAT, all requests from the same internal IP address and port, to a specific destination IP address and port, are mapped to the same external IP address and port. If the same host sends a packet with the same source address and port, but to a different destination, a different mapping is used. Furthermore, only the external host that receives a packet can send a user data protocol (UDP) packet back to the internal host.

Host Selection Based on NAT Type

Figure 1:
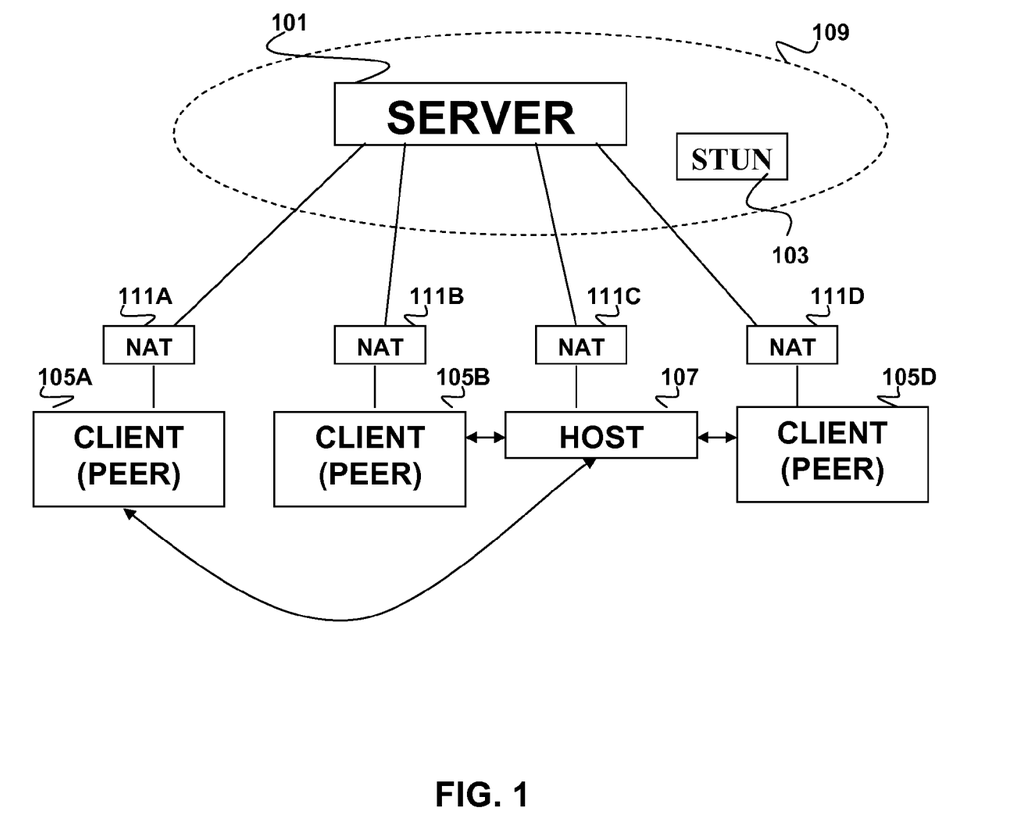
FIG. 1 is a schematic diagram illustrating a P2P network according to an embodiment of the present invention.

FIG. 1 is a schematic diagram illustrating a P2P network according to an embodiment of the present invention. Client devices 105A, 105B, 107, and 105D on the network are initially connected to a server 101 in an external network 109. By way of example, the server 101 may monitor data for game play between clients 105A, 105B, 107, and 105D connected to the external network 109. The clients 105A, 105B, 107, and 105D may be situated behind corresponding network address translators (NAT) 111A, 111B, 111C and 111D. Each NAT may be configured according to an Internet standard that enables a local area network (LAN) to use one set of private IP addresses for internal traffic and a second set of global IP addresses for external traffic. Most NATs perform dynamic translation on IP addresses such that external networks have no way of reaching the internal network prior to the internal network initiating communication. However, because the clients 105A, 105B, 107, and 105D establish server-client relationships, communication between the server 101 and clients 105A, 105B, 107, and 105D is not limited by the NATs 111A, 111B, 111C and 111D.

In establishing a P2P network in which clients can communicate directly with each other, one client may be established as a host 107 by which other peers 105 (clients connected to the P2P network who are not the host) may establish direct connections with each other. By way of example and not by way of limitation, the peers 105 may be connected in a configuration known as a fully connected grid (FCG). Such a configuration prevents any one peer from being a bottle neck. In embodiments of the present invention, the host 107 may be determined based on each client's NAT profile. The NATs 111A, 111B, 111C and 111D may be of one of four different configurations generally referred to as Full Cone NAT, Restricted Cone NAT, Port Restricted Cone NAT, and Symmetric NAT.

A full cone NAT is one where all requests from the same internal IP address and port are mapped to the same external IP address and port. Any client can send a packet to the client behind a full cone NAT by sending a packet to the mapped external address for the client.

In a restricted cone NAT, all requests from the same internal IP address and port are mapped to the same external IP address and port. However, unlike a full cone NAT, an external client (with IP address X) can send a packet to the client behind the full cone NAT only if the internal host had previously sent a packet to IP address X.

A port restricted NAT is similar to a restricted cone NAT, but the restriction includes port numbers. Specifically, an external client can send a packet with a source IP address X and source port P to the client behind the port restricted NAT only if the client behind the port restricted NAT had previously sent a packet from IP address X and port P.

In a symmetric NAT, all requests from the same internal IP address and port, to a specific destination IP address and port, are mapped to the same external IP address and port. If the same host sends a packet with the same source address and port, but to a different destination, a different mapping is used. Furthermore, only the external host that receives a packet can send a UDP packet back to the internal host.

Traversal of full cone, restricted cone and port restricted cone NATs is relatively straightforward and somewhat more complicated for symmetric NATs. NAT traversal may be implemented if a client is behind a symmetric NAT, e.g., as described in commonly-assigned US Patent Application Publication Number 20070076729. In particular, the client may perform a port prediction involving construction of a list of predicted transport addresses on the NAT that the client is behind. The client may then send an INVITE message containing the list of predicted transport addresses from the first node to a second client. The client behind the symmetric NAT may then perform a connectivity check with the second node using the predicted transport addresses. Connectivity checks may be performed by e.g., by sending simple traversal of user data protocol (UDP) through NAT (STUN) requests to each predicted transport address, in parallel. When the client behind the symmetric NAT receives these, it sends a STUN response to the second client. If the second client receives the STUN response, it can then begin to send media to that address.

There may be NAT types other than the four described above. In some cases it may be possible to traverse such NATs using standard techniques and in other cases the NAT behavior may be so unpredictable or unstable that communication with a client behind such a NAT is unreliable.

Because the duty of the host 107 is to communicate information between other peers 105A, 105B, and 105D it is essential that the host 107 be behind a NAT of a type that does not interfere with its ability to communicate. In embodiments where the peers 105A, 105B, 105D and the host 107 are connected in a fully connected grid (FCG) it is particularly desirable to use a host behind a NAT that does not interfere with its ability to communicate in order to provide the highest level of service to the greatest number of peers. There have been cases where a NAT identified as having questionable (unknown) support for P2P has actually performed quite well against the other NAT types in use by the existing peers in the P2P network. By selecting a host 107 with the most favorable NAT profile, more reliable peer-to-peer communication may be obtained. As used herein, the term P2P communication generally refers to direct communication between client devices connected to a network. Examples of P2P applications include, but are not limited to, the voice over internet protocol (VoIP), bit torrent transmission, video transmission, file sharing, data sharing, and other types of direct data transfer between clients that does not exceed the bandwidth capabilities of an individual client. Once the host 107 has been established, peers 105A, 105B, 105D can communicate with each other by initially transmitting information to the host 107 which then relays that information to the respective recipient peers 105A, 105B, 105D, or they may transmit information directly after using host 107 to establish this direct communication path.

In certain embodiments, clients 105A, 105B, 105D and 107 may obtain their NAT profile information through a simple traversal of user data protocol (UDP) through NAT (STUN) server 103 that is associated with the external network 109. STUN server 103 is a lightweight protocol proposed by Internet Engineering Task Force (IETF) that allows an IP enabled client to discover the presence and types of NAT that the client is behind. STUN 103 works with most NAT types and does not depend on any special behavior of the NAT. The STUN server 103 acts like a mirror held up to a client 105A so that the client 105A can see how its local transport address gets mapped to a public transport address. The client 105A can also determine the type of the NAT 111A that the client 105A is behind through communication with the STUN server 103.

By way of example and not by way of limitation, each client 105A, 105B, 107, 105D may use a STUN server 103 to obtain NAT profile information, that it may then relay that information to the central server 101 in order for the central server 101 to determine which client would make the most favorable host 107. Likewise, a client 105A, 105B, 107, 105D may use a STUN server 103 to obtain NAT profile information that may then be relayed to all other clients 105 attempting to communicate through the P2P network in order for the clients 105A, 105B, 107, 105D to best determine the host 107.

Figure 2:
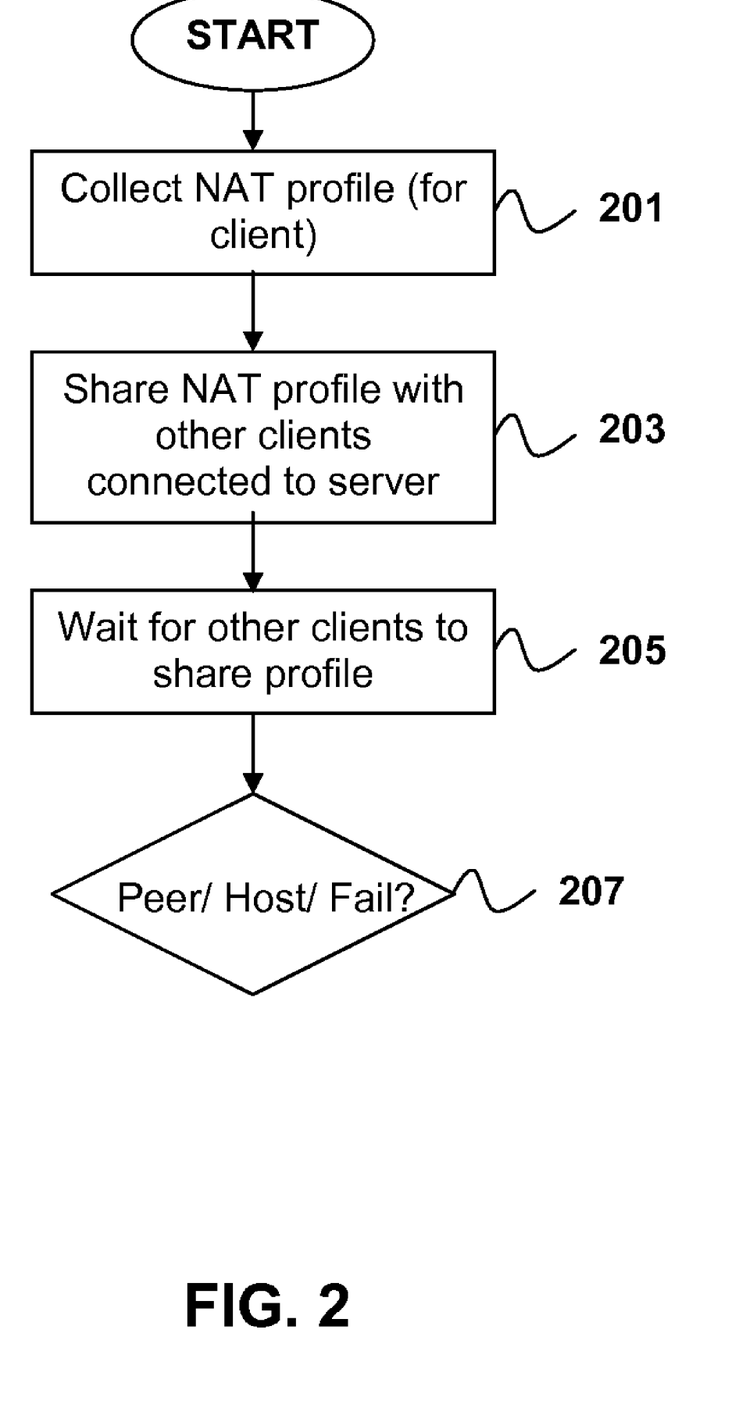
FIG. 2 is a flow diagram illustrating a method for host selection based on discovered NAT type according to a specific embodiment of the present invention from the client's perspective.

FIG. 2 is a flow chart illustrating the basic method for host selection based on discovered NAT type from a client's perspective. Each client connected to the server 101 may collect its own NAT profile information for use with the P2P network, as indicated at 201. This profile information may include information regarding the type that the client is behind, information regarding whether the NAT supports universal plug and play (UPnP), information regarding whether the NAT exhibits port preservation, and information regarding whether the NAT supports port predictability. As used herein, port preservation means that once an internal IP address mapped to a particular external port it will be consistently mapped to that particular port. As used herein, port predictability means that it is possible to predict the external port to which an internal IP address will be mapped, even if it is not always the same port. For example, the external port number may be consistently incremented with each attempted mapping of the internal IP address.

In addition to NAT behavior, each client's profile information may include quality of service (QoS) information. As used herein, the term QoS information, includes information regarding a client device that is related to how well the client device can communicate with other client devices. By way of example, but not by way of limitation, such information may relate to how fast the client can communicate, how reliably the client can communicate, or some combination of both. Particular examples of QoS information include, but are not limited to ping time, bandwidth behavior, latency, geography, IP provider.

The profile information for each client may be used to create a priority list amongst all the clients connected to the server in order to best select the host for P2P communication. If there is a tie in priority between potential hosts, ordinal numbers may be assigned to determine which potential host is selected as the actual host. In some embodiments, such ordinal numbers may be assigned by a server as indicated at 203, e.g., in the order in which the clients connected to the server. Alternatively, a distributed arbitration algorithm may be used to select a host from amongst two or more equally suitable potential hosts. If the initial host decides to leave the P2P network or is somehow disconnected from the network, this information may be used to select the next host for the P2P network.

Once the profile information has been collected by a given client, the NAT profile for that client is shared with other clients that are connected to the server. Profile information includes an expected count of the number of clients connected to the server, in order to determine whether an optimized P2P network has been reached. At this point, each client waits until every other client has submitted their profile information regarding the NAT they are behind as indicated at 205. Once all NAT profiles have been submitted by the clients, a determination is made as to whether the client should be a host, peer or if they fail to meet the requirements for either as described at 207. This determination may be made based on the profile information obtained for each client described above. For example, by assigning a priority based on a number of factors, a host can be selected from amongst the available clients based on the client having the most favorable profile. The rest of the clients may be assigned as peers or may fail to be recognized as a peer or host based on their profile information. For example, a client behind a non-traversable NAT may not meet the requirements necessary to connect to the network as a peer or host. By way of example and not by way of limitation, the client that is unable to be recognized as a peer or host may update his profile to notify the rest of the P2P network of his status, and the expected count may be decremented to exclude this client from the P2P network.

Table 1 illustrates an example of a prioritization scheme that may be used to decide host assignments in a P2P network. By way of example, but not by way of limitation, the prioritization scheme may be broken down into 5 separate distinctions: Active, Likely, Unknown, In Progress, and Inactive. These are listed in host priority order in Table 1. An active tag indicates that a client is a very good candidate for host. A likely tag indicates that a client is a good candidate for host, but priority is still given to a client with an active tag. An unknown tag indicates that the network is unable to decide whether that particular client is a good candidate for host. An in progress tag indicates that the network is still deciding whether the client is a good candidate for host. Lastly, an inactive tag indicates that a client is unable to assume the duties of a host. In the example illustrated in Table 1, the priority tags may be based on 4 separate criteria: NAT type, universal plug and play (UPnP) capability, port preservation, and port predictability. However, several other factors may also be used in determining priority. These factors fall under a client's quality of service profile and may include QoS information including, but not limited to ping time, bandwidth behavior, geography, latency, and IP provider.

TABLE 1

| | Prioritization Tag | | | | |
|---|---|---|---|---|---|
| | Active | Likely (Scenario 1) | Likely (Scenario 2) | Unknown | Inactive |
| NAT Type | Cone (Full Cone, Restricted Cone, Port Restricted Cone) | Not Cone (Symmetric or anything else) | Symmetric | Symmetric | Not Cone (Symmetric or anything else) |
| UPnP | Doesn't matter | Yes | No | No | No |
| Port Preservation | Doesn't matter | Doesn't matter | Yes | Cannot determine | No |
| Port Predictability | Doesn't matter | Doesn't matter | Yes | Cannot determine | No |

Figure 3:
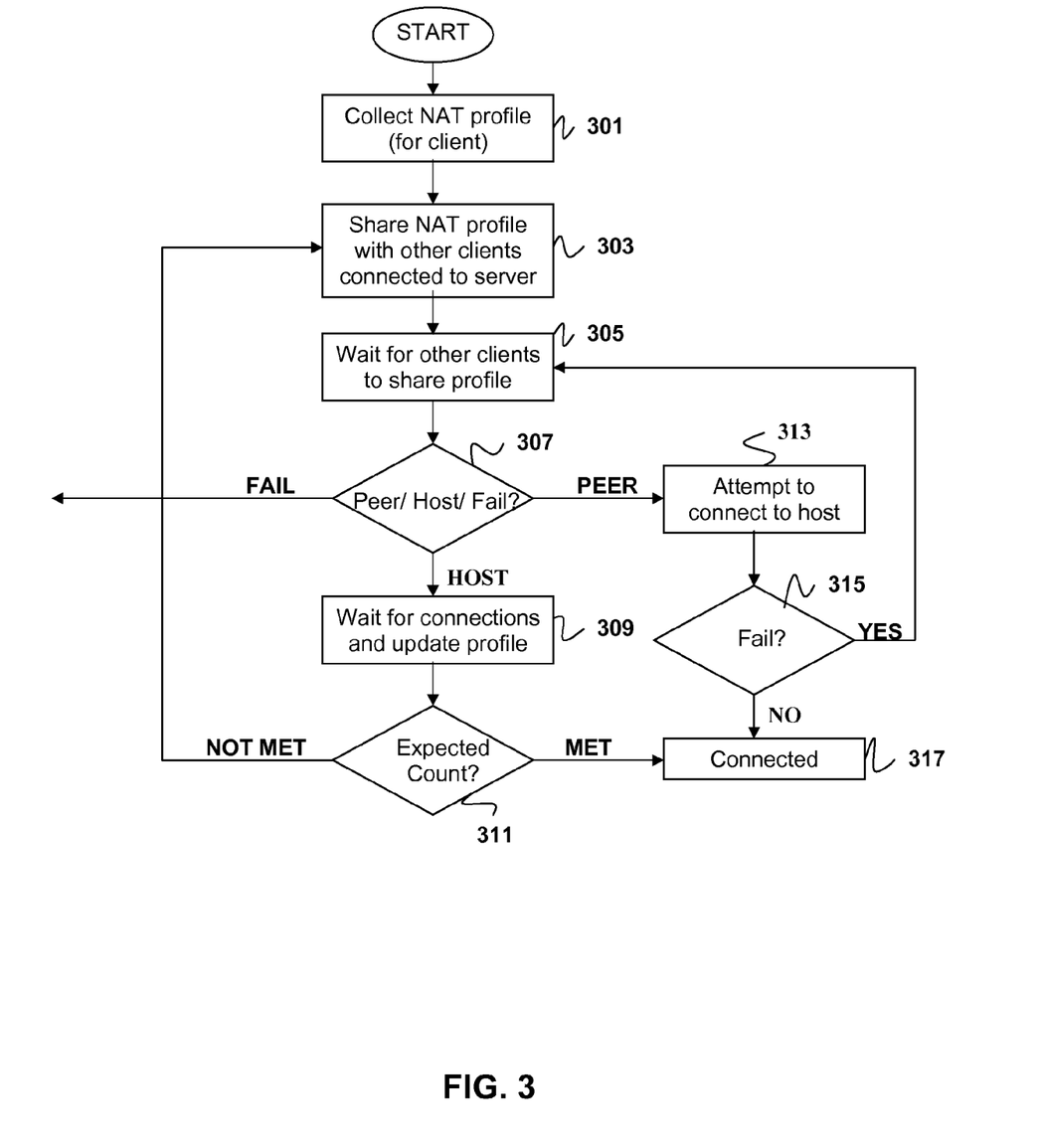
FIG. 3 is a flow diagram illustrating the basic method for host selection based on discovered NAT type from the client's perspective.

FIG. 3 is a flow chart illustrating a method for host selection based on discovered NAT type according to a specific embodiment of the present invention from the client's perspective. A client initially obtains profile information about the network address translator (NAT) that it is behind as described at 301. This profile information includes information regarding the NAT type, whether the NAT supports universal plug and play (UPnP), whether the NAT supports port preservation, and whether the NAT supports port predictability. In addition to this information, profile information may also include quality of service information including, but not limited to ping time and bandwidth behavior, geography, latency, IP provider, and the like. This information may be used to create a priority amongst several clients in order to determine a host for supporting peer-to-peer (P2P) communication amongst these several different clients. If the initial host decides to leave the P2P network or is somehow disconnected from the network, this information may be used to select the next host for the P2P network.

Once the client has obtained the profile information regarding the NAT it is behind, the client then shares this NAT profile with other clients that are connected to the same server as indicated at 303. Not only are these clients now aware of the profile information described above for all other clients, but they are also notified of the expected count of clients currently connected to the server. At this point, each client may wait until every other client has submitted their profile information regarding the NAT they are behind as indicated at 305. Once all NAT profiles have been submitted by the clients, a determination is made as to whether the client should be a host, peer or if they fail to meet the requirements for either as indicated at 307. This determination may be made based on the profile information obtained for each client described above. By assigning a priority based on a number of factors, a host can be selected amongst the clients based on having the most favorable profile. The rest of the clients may be assigned as peers or may fail to be recognized as a peer or host based on their profile information. For example, a client behind a non-traversable NAT may not meet the requirements necessary to connect to the network as a peer or host. By way of example and not by way of limitation, the client who is unable to be recognized as a peer or host may update his profile to notify the rest of the P2P network of his status, and the expected count may be decremented to exclude this client from the P2P network.

The client that is assigned the duty of being a host may then wait for the rest of the clients on the network to connect and also updates their profiles as indicated at 309. Once all the clients have connected to the host, the expected count may be checked to determine whether all clients that are connected to the server have connected to the host as indicated at 311. If the count is as expected, P2P communication is enabled as indicated at 317. If however, the count is less than expected due to one or more clients failing to meet the requirements of being a host or peer, then the count is reduced and the process may begin again at 303.

If the client is determined to be a peer, it may attempt to connect to the host once the host has been determined as indicated at 313. A determination is made as to whether the peer is able to connect to the host or fails to connect to the host as indicated at 315. If the client is able to connect to the host, then it waits for all other peers to connect to the host before P2P communication is enabled as described at 317. If the client is unable to connect to the host, then the client's profile information is updated and the process begins again at 305. Ultimately, if the client is unable to connect to the host on multiple occasions, the count may be decremented leaving that individual client out of the P2P network.

If a peer failure occurs while collecting the NAT information, then this may be recorded as a failure and shared with the other peers. It may be assumed that sharing the data or waiting for the data will not fail, e.g., if the communication of this data is done through a reliable communication channel, such as the server 101. If the communication to the server 101 fails at any point during this process then the entire process may be aborted and the remaining clients are notified of this disconnect as specified by the protocol used to communicate with the server 101. The remaining clients will no longer be waiting for a response from the disconnected client.

Once a host has been identified from among the client devices, the server 101 may offload one or more functions to the P2P grid managed by the peer designated as the host. Such functions may be assumed by the host and/or any of the peers within the P2P grid. By way of example, but not by way of limitation, the P2P grid maybe a fully connected grid or a star topology where by the all communication goes through the host. The topology of the grid is not strictly relevant to embodiments of this invention. What is relevant is that the primary point of connection (the host) to a P2P grid of any topology is established based on the behavior of a NAT associated with that primary point of connection.

Figure 4:
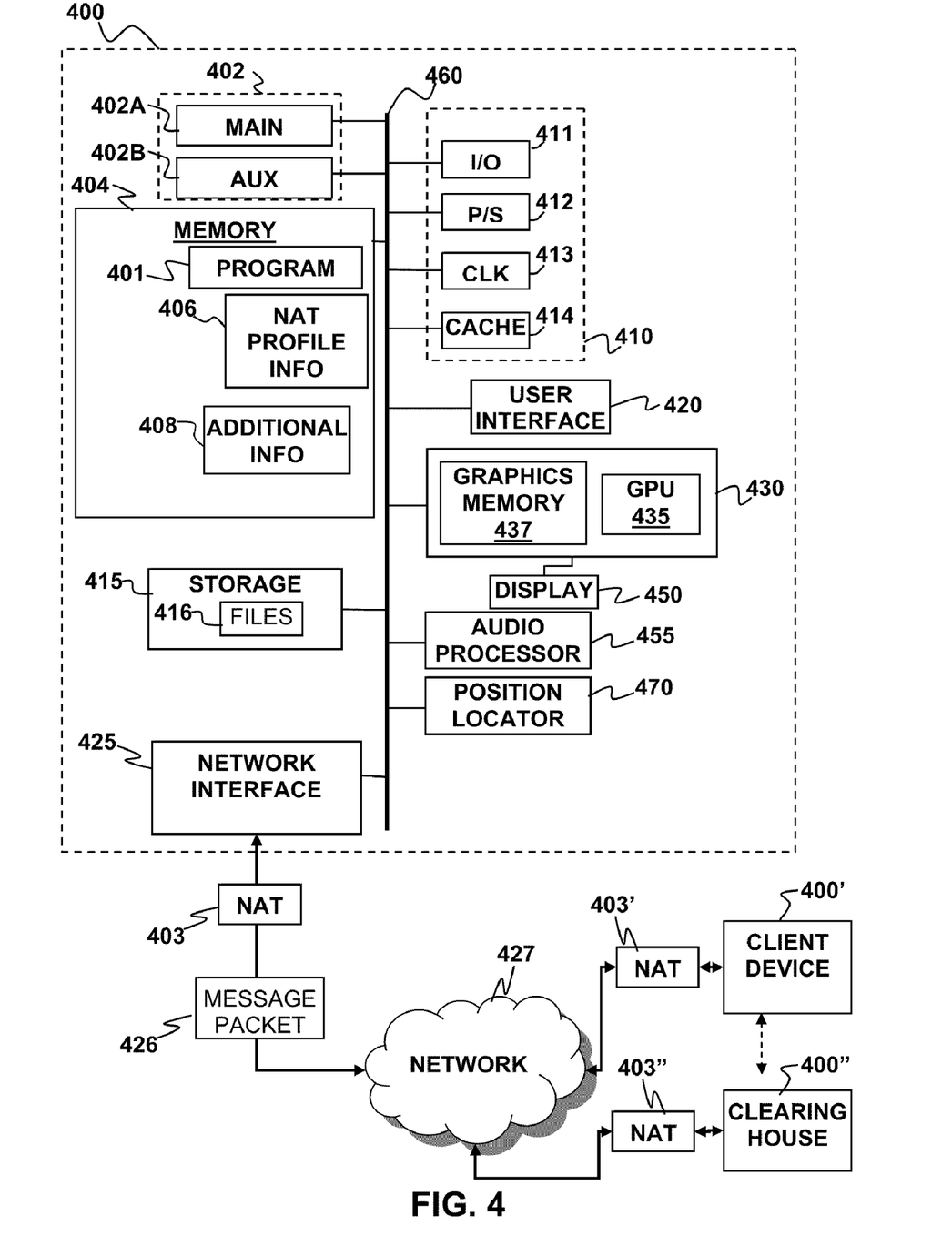
FIG. 4 is a block diagram illustrating an example of a client interface according to an embodiment of the current invention.

A client device 400 may be configured to implement a method for host determination according to an embodiment of the present invention as shown in FIG. 4. By way of example, and without loss of generality, the client device 400 may be implemented as part of a digital television set, personal computer, video game console, personal digital assistant, mobile or handheld device such as a cellular phone or personal digital assistant, handheld video game device, portable email device and the like, or other digital device.

The device 400 may include a central processing unit (CPU) 402 and a memory 404 coupled to the CPU 402. The CPU 402 may be configured to run software applications and, optionally, an operating system. Some embodiments of the present invention may take advantage of certain types of processor architecture in which the CPU 402 includes a main processor 402A and one or more auxiliary processors 402B. Each auxiliary processor 402B may have its own associated local data storage. One example, among others of such processor architecture is a Cell Processor. An example of Cell Processor architecture is described in detail, e.g., in Cell Broadband Engine Architecture, copyright International Business Machines Corporation, Sony Computer Entertainment Incorporated, Toshiba Corporation Aug. 8, 2005 the entire contents of which are incorporated herein by reference.

Referring again to FIG. 4, the receiving device 400 may also include well-known support functions 410, such as input/output (I/O) elements 411, power supplies (P/S) 412, a clock (CLK) 413 and cache 414. The device 400 may further include a fast data storage device 415 such as a hard disk drive that provides non-volatile storage for applications and data. The fast storage device 415 may be used for temporary or long-term storage of files 416 retrieved from a slower data storage device. By way of example, the storage device 415 may be a fixed disk drive, removable disk drive, flash memory device, tape drive. Alternatively, the storage device 415 may be, e.g., a CD-ROM, DVD-ROM, Blu-ray, HD-DVD, UMD, or other optical storage devices. Files 416 from a slower storage device may be temporarily stored in a faster storage device in a hardware cache for quick loading into the memory 404.

One or more user input devices 420 may be used to communicate user inputs from one or more users to the system 400. By way of example, one or more of the user input devices 420 may be coupled to the client device 400 via the I/O elements 411. Examples of suitable input devices 420 include keyboards, mice, joysticks, touch pads, touch screens, remote control units, light pens, still or video cameras, and/or microphones.

The client device 400 may communicate with one or more other client devices in a peer-to-peer network through a network interface 425 that facilitates communication via the electronic communications network 427. The network interface 425 may be configured to implement wired or wireless communication over local area networks and wide area networks such as the Internet. The system 400 may send and receive data and/or requests for files via one or more message packets 426 over the network 427. By way of example and not by way of limitation, the electronic communication network 427 may be a local area network, wide area network, or personal area network (e.g., blue-tooth) that can communicate between the device 400 and one or more other client devices.

The memory 404 may store applications and data for use by the CPU 402. The memory 404 may be in the form of an integrated circuit (e.g., RAM, DRAM, ROM, and the like). A computer program 401 may be stored in the memory 404 in the form of instructions that can be executed on the processor 402.

The program 401 may include instructions that when executed by the processor cause it to implement a method for determining a host from among a group of two or more peer client devices in a peer-to-peer network. By way of example, and without loss of generality, the program 401 may, upon execution, cause the device 400 to implement the method 200 illustrated in FIG. 2 or the method 300 illustrated in FIG. 3. In particular the program 401 may cause the device 400 to a) collect NAT profile information for the device 400; b) share the NAT profile information for the device with one or more other client devices 400', 400" connected to the network 427;

c) receive NAT profile information for the one or more other client devices; and d) determine from the NAT profile information for the client device 400 and the NAT profile information for the one or more other client devices which of the client devices 400, 400', 400" to designate as the host.

NAT profile information 406 for the client device 400 and the other client devices 400', 400" may be stored in the memory 404 for use in determining the host. Each of the client device 400, 400' and 400" may be behind a corresponding NAT 403, 403' and 403". The client device 400 may reside behind a network address translator (NAT) 403, which translates an internal IP address for the client device 400 to a public IP address that is seen by other devices. It is noted that the NAT 403 is usually not a part of the client device 400 although some types of client device may include a NAT. Furthermore, embodiments of the present invention may be implemented if any or all of the client devices 400, 400', 400" is not behind a NAT at all.

The NAT profile information 406 may include, but is not limited to, information about the type of NAT (if any) that the client device 400 is behind, the ability of the NAT to engage in universal plug and play (UPnP), the NAT's ability to maintain port preservation, and the NAT's port predictability. The program 401 may implement selection may be based on the criteria described above, with respect to Table 1. Each of the other client devices 400', 400" may be similarly configured and may implement the same host selection process. If all client devices 400, 400', and 400" use the same program 401 and the profile information 406 it is reasonable to expect that they should all make the same host determination.

In some situations, it may be desirable for the program 401 to apply a supplemental arbitration filter based on additional information 408, such as quality of service information, to arbitrate a determination the host device from among two or more equally likely candidate devices. Quality of service information may include factors such as the client's ping time, bandwidth behavior, geography, latency, IP provider, etc, and other factors as described above. Such additional information 408 may also be stored in the memory 404.

The client device 400 may further comprise a graphics subsystem 430, which may include a graphics processing unit (GPU) 435 and graphics memory 437. The graphics memory 437 may include a display memory (e.g., a frame buffer) used for storing pixel data for each pixel of an output image. The graphics memory 437 may be integrated in the same device as the GPU 435, connected as a separate device with GPU 435, and/or implemented within the memory 404. Pixel data may be provided to the graphics memory 437 directly from the CPU 402. Alternatively, the CPU 402 may provide the GPU 435 with data and/or instructions defining the desired output images, from which the GPU 435 may generate the pixel data of one or more output images. The data and/or instructions defining the desired output images may be stored in memory 404 and/or graphics memory 437. In an embodiment, the GPU 435 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 435 may further include one or more programmable execution units capable of executing shader programs.

The graphics subsystem 430 may periodically output pixel data for an image from the graphics memory 437 to be displayed on a video display device 450. The video display device 450 may be any device capable of displaying visual information in response to a signal from the device 400, including CRT, LCD, plasma, and OLED displays that can display text, numerals, graphical symbols or images. The digital broadcast receiving device 400 may provide the display device 450 with a display driving signal in analog or digital form, depending on the type of display device. In addition, the display 450 may be complemented by one or more audio speakers that produce audible or otherwise detectable sounds. To facilitate generation of such sounds, the client device 400 may further include an audio processor 455 adapted to generate analog or digital audio output from instructions and/or data provided by the CPU 402, memory 404, and/or storage 415.

The receiving device 400 may optionally include a position location device 470. Such a device may be based on any suitable technology capable of providing information on the geographic location of a device. Examples of existing technology include global positioning satellite (GPS) technology, inertial guidance technology, and the like. Information from such devices may be used in digital broadcast data applications such as navigation for mobile or hand-held devices.

According to certain embodiments, it may be useful to determine a geographic location of the client device 400. Certain QoS considerations, such as bandwidth, ping time and latency may be affected by the location of the device. By way of example and not by way of limitation, to facilitate host determination, the position-locating device 470 may provide geographic location information that the program 401 may use in determining whether the client device 400 is a good candidate to be the host for a peer-to-peer service.

The components of the device 400, including the CPU 402, memory 404, support functions 410, data storage devices 415 user input devices 420, network interface 425, graphics unit 430, audio processor 455 and position location device 470 may be operably connected to each other via one or more data buses 460. These components may be implemented in hardware, software or firmware or some combination of two or more of these.

Embodiments of the present invention allow for cooperative host determination and host migration in peer-to-peer network situations.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. In a peer, a method for determining which of two or more peers behind NATs to designate as a host for a service within a peer to peer grid, the method comprising:
   a) collecting NAT profile information for the peer;
   b) sharing the NAT profile information for the peer with one or more other peers of the two or more peers;
   c) receiving NAT profile information for the one or more other peers; and
   d) determining from the NAT profile information for the peer and the NAT profile information for the one or more other peers which of the two or more peers to designate as the host, wherein d) includes assigning priority values to each of the two or more peers based on the NAT profile information for the peer and the NAT profile information for the one or more other peers and selecting the host based on the priority values, wherein the NAT profile information for the seer or the one or more other peers that is used to assign the priority values includes a NAT type, information regarding support of universal plug and play (UPnP), port predictability information, or port preservation information.

2. The method of claim 1, wherein a) includes collecting NAT profile information through use of a STUN server.

3. The method of claim 1, wherein b) includes relaying the NAT profile information for the peer to the one or more other peers via a pre-established connection between the peer and the one or more other peers.

4. The method of claim 3, wherein the pre-established connection includes use of a server for an application common to the two or more peers.

5. The method of claim 4, wherein the server offloads one or more functions to the peer to peer grid, which is managed by the peer designated as the host.

6. The method of claim 3, wherein the pre-established connection includes one of the one or more other peers acting as a host.

7. The method of claim 3, wherein c) includes receiving the NAT profile information for the one or more other peers via the pre-established connection.

8. The method of claim 1, wherein, if two or more of the two or more peers are of equal priority values, d) includes resolving which of the two or more potential hosts of equal priority values to designate as the host.

9. The method of claim 8, wherein resolving which of the two or more potential hosts of equal priority values to designate as the host includes designating as the host one of the two or more potential hosts of equal priority value having a higher ordinal value, wherein a different ordinal value is assigned to each of the two or more potential hosts.

10. The method of claim 8, wherein resolving which of the two or more potential hosts of equal priority values to designate as the host includes a distributed arbitration algorithm.

11. The method of claim 1, further comprising, if the peer is designated as the host, notifying the one or more other peers of the peer's designation as host and waiting for the one or more other peers to connect.

12. The method of claim 11, further comprising comparing a number of peers connected to the host to an expected count and sharing the number of peers connected to the host with the one or more other peers if the number of peers connected to the host does not equal the expected count.

13. The method of claim 1, further comprising attempting to connect the peer to the host if the peer is not designated as the host.

14. The method of claim 11, further comprising, if the peer fails to connect to the host, notifying the two or more other peers that the peer has failed to connect to the host.

15. A peer device, comprising:
a computer processor;
a computer memory coupled to the processor;
a network interface coupled to the processor, wherein the network interface is configured to facilitate communication between the processor and one or more other peer devices connected in a peer-to-peer grid; and
a set of computer readable instructions embodied in the memory, wherein the computer-readable instructions are configured to implement a method for determining which NAT'd peer device in the peer-to-peer grid to designate as a host for a service within the peer to peer grid, the method comprising:
a) collecting NAT profile information for the peer;
b) sharing the NAT profile information for the peer with one or more other peers of the two or more peers;
c) receiving NAT profile information for the one or more other peers; and
d) determining from the NAT profile information for the peer and the NAT profile information for the one or more other peers which of the two or more peers to designate as the host, wherein d) includes assigning priority values to each of the two or more peers based on the NAT profile information for the peer and the NAT profile information for the one or more other peers and selecting the host based on the priority values, wherein the NAT profile information for the peer or the one or more other peers that is used to assign the priority values includes a NAT type, information regarding support of universal plug and play (PNnP), port predictability information, or port preservation information.

16. A computer readable medium having a set of computer readable instructions embodied therein, wherein the computer-readable instructions are configured to implement a method for determining which of two or more NAT'd peer devices in a peer-to-peer grid to designate as a host for a service within the peer to peer grid, the method comprising:
a) collecting NAT profile information for the peer;
b) sharing the NAT profile information for the peer with one or more other peers of the two or more peers;
c) receiving NAT profile information for the one or more other peers; and
d) determining from the NAT profile information for the peer and the NAT profile information for the one or more other peers which of the two or more peers to designate as the host, wherein d) includes assigning priority values to each of the two or more peers based on the NAT profile information for the peer and the NAT profile information for the one or more other peers and selecting the host based on the priority values, wherein the NAT profile information for the peer or the one or more other peers that is used to assign the priority values includes a NAT type, information regarding support of universal plug and play (PNnP), port predictability information, or port preservation information.

* * * * *